Patented Mar. 7, 1939

2,149,525

UNITED STATES PATENT OFFICE 2,149,525

SEPARATION OF AMINODIPHENYLS

Russell L. Jenkins, Anniston, Ala., assignor, by mesne assignments, to Monsanto Chemical Company, a corporation of Delaware No Drawing. Application October 18, 1934, Serial No. 748,895

6 Claims. (Cl. 260—582)

This invention relates to the separation of the isomers of aminodiphenyl and particularly to the separation of the ortho- and para-monoaminodiphenyls.

An object of the present invention is to provide a means of separation of the ortho- and para-aminodiphenyls from each other, which means shall be simple and inexpensive.

In the manufacture of aminodiphenyls, either by reduction of the corresponding nitro bodies or by ammonolysis from the corresponding halogenated bodies, it is convenient to work with a mixture of the intermediate isomers. This is so because the usual nitration or halogenation reactions both yield mixtures of isomers.

Methods of separation based upon distillation of the isomeric amines are unsatisfactory because of the fact that the respective boiling temperatures are very close together.

Methods of separation based upon solubility differences have hitherto been unsatisfactory because one of the isomers does not exhibit a sharp difference in solubility with respect to the other.

In studying the solubility method of separation of the isomers, I have now discovered that the sulfates of the isomers possess properties by which they may readily be separated. I have found, for example, that if sulfuric acid be added to a mixture of the free amines, the para isomer will form a normal sulfate, while the ortho isomer will form the acid sulfate. Furthermore, the normal sulfate is water insoluble, while the acid sulfate is water soluble.

It has also been discovered that the normal sulfate of the para isomer will form before the acid sulfate of the ortho isomer and, hence, by the controlled addition of sulfuric acid I may form the insoluble normal sulfate in the presence of the free amine constituting the other isomer.

Making use of these principles I am enabled to effect a quantitative separation of the ortho and para isomers from each other or a separation of a predetermined quantity of the para isomer from a mixture of the two isomers.

According to one of these methods I treat a mixture of 2- and 4-aminodiphenyls dissolved in an organic solvent with sufficient half-normal sulfuric acid to combine with the 4-aminodiphenyl. Under these circumstances a white precipitate of the normal sulfate of the para isomer is formed. This may be filtered from the solution which contains the free ortho isomer. A substantially quantitative separation of the isomers is thus effected.

This method is illustrated by the following experimental results:

To a solution containing—
  8.5 g. of 4-aminodiphenyl
  5.67 g. of 2-aminodiphenyl
  30.00 c. c. of benzol
were added 50 c. c. of water and 100 c. c. of N/2 $H_2SO_4$ (equivalent to 8.45 g. of 4-aminodiphenyl). This mixture was filtered and the precipitate washed with cold benzol, dried and weighed, weight equaled 10.8 g., equivalent to 99.1% yield. The free para amine was now recovered from the amine sulfate by neutralization with sodium carbonate. The amine so recovered had a freezing point of 51.2° C. (pure 4-aminodiphenyl freezes at 52.6° C.).

The filtrate containing the 2-aminodiphenyl was dried and freed of benzol. The freezing point of the 2-aminodiphenyl recovered was 45.9° C. (pure 2-aminodiphenyl freezes at 48.7° C.).

In some cases the crude mixed amines will contain some diphenyl. This body may be removed from the para amine by washing the precipitated para amine sulfate with an organic solvent, such as benzol.

The acid strength used may be varied somewhat from the figures above given, it being understood that the separation described works best with dilute sulfuric acid, that is, acid having a strength of from 10% to 17%.

By varying the quantity of acid used, I may separate out varying proportions of the mixture, thus providing a valuable degree of flexibility. It is possible, accordingly, to separate all or any part of the para isomer from the remainder merely by adding an amount of acid sufficient to combine with and render insoluble the proportion of the para isomer desired. By leaching the acidified mixture of amines either with water or with organic solvents, it is possible to remove the soluble part. Having rendered the para isomer insoluble both in aqueous and organic solvents by the acidification treatment, the choice of solvents will depend upon whether or not the ortho isomer has been acidified. If this isomer has not been acidified, an organic solvent, such as benzol, may be used to make the separation. If the ortho isomer has been acidified, then water is the indicated solvent.

Having now particularly described my invention and the manner in which it may be used, it will be apparent that it is susceptible to various changes and modifications without departing from the spirit thereof, and I desire that no limitations be placed thereupon except as indicated by the prior art or as specifically set out in the appended claims.

What I claim is:

1. The method of separating a predetermined portion of para-aminodiphenyl from a mixture of ortho- and para-aminodiphenyls, which comprises the addition to said mixture of a quantity of sulfuric acid substantially equivalent to said predetermined amount of para-aminodiphenyl and separating the para-aminodiphenyl sulfate thus formed from the resulting mixture.

2. The process as defined in claim 1 and further characterized in that the free para- and ortho-aminodiphenyls are separated from the resulting mixture containing para-aminodiphenyl sulfate by extraction with benzol.

3. The process of separating ortho and para-aminodiphenyls from each other, which comprises adding to a mixture of said amines a proportion of sulfuric acid only sufficient to react with the para isomer in said mixture and then separating the free ortho-aminodiphenyl from the resulting mixture.

4. The process as defined in claim 3, and further characterized in that the free ortho-aminodiphenyl is separated from the resulting mixture containing para-aminodiphenyl sulfate by extraction with benzol.

5. The process of separating ortho- and para-aminodiphenyls from each other, which comprises adding to a solution of said aminodiphenyls in a solvent therefor, which solvent is immiscible with water and in which para-aminodiphenyl sulfate is insoluble, a quantity of sulfuric acid sufficient to form only the normal para-aminodiphenyl sulfate and thereafter separating the precipitated para-aminodiphenyl sulfate from the free ortho-aminodiphenyl in solution.

6. The process of separating ortho- and para-aminodiphenyls from each other, which comprises adding to a solution of said aminodiphenyls in benzol a quantity of sulfuric acid sufficient only to form insoluble normal para-aminodiphenyl sulfate and thereafter separating the precipitated para-aminodiphenyl sulfate from the benzol containing the dissolved ortho-aminodiphenyl.

RUSSELL L. JENKINS.